United States Patent [19]

Floyd

[11] Patent Number: 4,722,477
[45] Date of Patent: Feb. 2, 1988

[54] SCENTED HUNTING STRAP

[76] Inventor: John F. Floyd, 402 Hillcrest Offices, Spartanburg, S.C. 29302

[21] Appl. No.: 919,842

[22] Filed: Oct. 16, 1986

[51] Int. Cl.⁴ .................................... A01M 00/00
[52] U.S. Cl. .................................... 239/36; 239/53; 36/136; 224/267
[58] Field of Search ............... 239/34, 36, 53, 54, 239/55, 56, 57; 119/156; 224/267, 222; 222/175; 401/6, 196; 36/72 B, 132, 136

[56] References Cited

U.S. PATENT DOCUMENTS

| | | | |
|---|---|---|---|
| 1,780,407 | 1/1929 | Smith | 239/36 |
| 3,578,545 | 5/1971 | Carson et al. | 239/53 |
| 4,047,505 | 9/1977 | McAndless | 119/156 |
| 4,609,245 | 9/1986 | Sakschek | 239/36 |

Primary Examiner—Andres Kashnikow
Assistant Examiner—Karen B. Merritt
Attorney, Agent, or Firm—Dority & Manning

[57] ABSTRACT

A scented hunting device having a scented material member attached to a flexible, impervious body member. The scented material member is preferably constructed with an absorbent fibrous or felt material and can absorb and be thoroughly infiltrated with a scented substance for masking human odors from animal detection. Co-operating fasteners are attached to the flexible body member for allowing the scented hunting device to be attached to a hunter during hunting.

7 Claims, 8 Drawing Figures

SCENTED HUNTING STRAP

BACKGROUND AND SUMMARY OF THE INVENTION

The present invention relates to a scented strap which can be worn by a hunter during hunting for masking the hunter's human odors.

In hunting game animals, such as deer, it has been found that the natural human odors inherent to the hunter can be detected by the animal, which causes the animal to avoid the hunter. Obviously, this makes sighting the animal much more difficult.

Many scented substances have been developed to hide human odors from animal detection. Such scented substances are typically applied in liquid form directly to the clothes and boots worn by the hunter, generally around the sleeves and pants legs of the hunting clothing and to the soles of the shoes or boots worn during hunting. Once applied to the hunter's clothing and boots, the scented substance serves to mask the human odors of the hunter to some extent from animal detection. However, the scented substances are only effective for a limited time, when applied to clothing, because the scented substances evaporate quickly due to the make-up of fabrics typically used in hunting clothes. The scented substance applied to the boots, particularly that applied to the soles of the boots, quickly wears off of the boots during walking.

SUMMARY OF THE INVENTION

It is an object of the present invention to provide a scented hunting device for dispensing a scented substance to mask human odors from detection by animals.

Another object of the present invention is to provide a scented hunting device which can be readily attached to an object or to a hunter.

Another object of the present invention is to provide a scented hunting device which disperses a scented substance to the environment at a generally constant, prolonged rate during use.

Another object of the present invention is to provide a scented hunting device which may be used repeatedly without significantly reducing the effectiveness of the dispersal of the scented substance into the environment.

Another object of the present invention is to provide a scented hunting device which may be easily impregnated initially or re-impregnated with a scented substance.

Still another object of the present invention is to provide a scented hunting device which may be readily constructed and shaped to various configurations to accommodate a variety of applications.

Yet another object of the present invention is to provide a scented hunting strap which is of simple and relatively inexpensive construction.

Generally, the present invention includes a device for attachment to an object, the device dispensing a scented substance to mask human odors from detection by animals, the device comprising: a flexible body member; a material capable of absorbing a scented substance attached to the flexible body member; the material being capable of allowing the scented substance, once absorbed by the material, to disperse freely therefrom upon exposure of the scented material to the environment; and fastener means attached to the flexible body member for use in attaching the device to the object.

More specifically, the scented hunting device of the present invention preferably includes a non-absorbent flexible strap having an absorbent felt material attached thereto. The felt material is impregnated with a conventional liquid scented substance designed to mask human odors from aniaml detection. The felt material allows the scented substance to disperse freely therefrom upon exposure of the felt material to air. Co-operating fastening members, preferably constructed with mateable material such as Velcro (trademark), are attached at each end of the flexible strap and allow for the flexible strap to be wrapped around an arm, leg, foot, etc. of the hunter and attached together.

BREIF DESCRIPTION OF THE DRAWINGS

The foregoing as well as other objects of the present invention will be more apparent from the following detailed description of the preferred embodiment of the invention, when taken together with the accompanying drawings, in which.

DESCRIPTION OF THE PREFERRED EMBODIMENT

Figure 1:
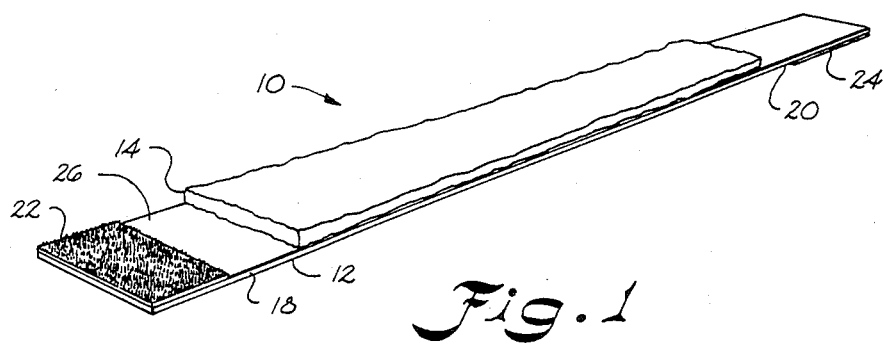
FIG. 1 is a perspective view of a preferred form of a scented hunting device constructed in accordance with the present invention.

Referring to the drawings in detail, wherein like reference characters represent like elements throughout the various views, the scented hunting device of the present invention is designated generally by the reference character 10. As shown in FIG. 1, scented hunting device 10 includes a flexible body member or strap 12 having scent dispersal material member 14 attached thereto. Attached to the ends of flexible strap 12 are co-operating fastening members 16.

Because scent masking substances typically have a pungent odor, flexible body member 12 is preferably constructed of a non-absorbent, non-porous material for preventing a scented substance applied to scent dispersal member 14 from passing through flexible strap 12. This prevents the scented substance from contacting the clothing and boots worn by the hunter upon attachment of strap 12 to the hunter. Flexible strap 12 can be constructed of rubber, plastic, treated non-absorbent fabric, polymeric film, coated fabric, or any other suitable material which is impervious to the passage therethrough of the scented substance.

The scent dispersal member is preferably constructed of a fibrous or sponge-like absorbent material which is capable of absorbing a scented substance, although a scent-impregnated non-absorbent material such as a plastic or wax, etc. could also be used. The scent dispersal, or, absorbent material member 14 is impregnated with a scented substance, usually a liquid, by pouring the scented substance directly thereon or by soaking absorbent material member 14 directly in the scented substance. The scented substance can be reapplied to absorbent material member 14 whenever desired, particularly when the effectiveness of absorbent material member 14 becomes diminished after prolonged dispersal of the scented substance therefrom due to exposure of absorbent material member 14 to the environment.

Although a sponge or any other suitable absorbent or scented material could be used, felt material is preferably used in the construction of absorbent material member 14. The felt material is made of natural fibers, such as wool, and/or man-made fibers, such as synthetic polymeric fibers such as polyesters, acrylics or the like. The felt can be made up of non-woven and/or woven fibers. Because the fibers of wool felt typically lock together due to the natural tendency of wool fibers to engagingly entangle with one another, felt material may be created with wool fibers without weaving. Woven felt is created using conventional weaving techniques and can also be used to construct absorbent material member 14. Various man-made fibers such as synthetic polymerics can also be combined together, with or without wool, to form felt material.

An advantage of forming absorbent material member 14 from a fibrous or felt material is that the felt material readily absorbs and retains liquids due to the capillary action characteristic of the fibers, through which the fibers draw liquid into themselves. This characteristic of a fibrous or felt material allows for a thorough infiltration of absorbent material member 14 by a liquid to be achieved by merely soaking absorbent material member 14 directly in the liquid or by applying the liquid thereto by some other means. Because of the ability of the felt material to allow absorbent material member 14 to become thoroughly absorbed with a liquid, aromatic human odor-masking scents, typically oils, can be readily provided in absorbent material member 14. The thorough absorption of the scented substance into absorbent material member 14 allows for a large amount of the scented substance to be supplied scented hunting device 10. Also, because of the manner in which the fibrous or felt material retains the scented substance by capillary action, the dispersal of the scented substance from absorbent material member 14 into the surrounding air during hunting is relatively constant and prolonged. Moreover, because the scented substance can be so thoroughly absorbed by absorbent material member 14, a relatively large amount of the scented substance can be supplied the scented hunting device 10, thereby significantly lengthening the effective aromatic life of scented hunting device 10.

An important characteristic of synthetic polymeric fibers, which are preferably included in the felt material used in constructing absorbent material member 14, is that such fibers are oleophyllic in nature, meaning that they have an attraction for oils. This characteristic of synthetic polymeric fibers allows for an oily scented substance to be thoroughly absorbed by absorbent material 14, thereby increasing the amount of the scented substance absorbed by absorbent material member 14 and, accordingly, increasing the effective aromatic life of scented hunting device 10.

Figure 2:
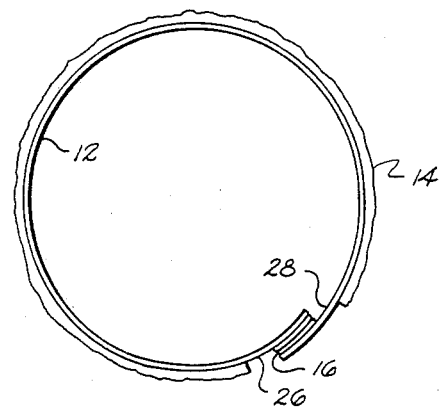
FIG. 2 is a top view of a preferred form of a scented hunting device having the ends thereof attached to one another.

Attached at each end 18, 20 of flexible strap 12 is a co-operating fastener 22, 24. Preferably, co-operating fasterners 22, 24 are constructed of mateable Velcro fastening materials with co-operating fastener 22 being located on an upper surface 26 of flexible strap 12 and co-operating fastener 24 being constructed of Velcro material complimentary to that of cooperating fastener 22, for mating engagement therewith, and attached to a lower surface 28 of flexible strap 2. Velcro-type materials generally include a mass of polymeric hooks on one material and a mass of engagement fibers, strands, or loops on an opposite material which receive and hold the hooks. As shown in FIG. 2, strap ends 18, 20 are fastened to one another through engagement of co-operating fasteners 22, 24. While co-operating fasteners 22, 24 are preferably constructed of hook and fiber or loop fasteners such as Velcro-type materials, various other conventional fasteners could also be used such as buttons, snaps, strings, hooks, clasps, etc.

Figure 3:
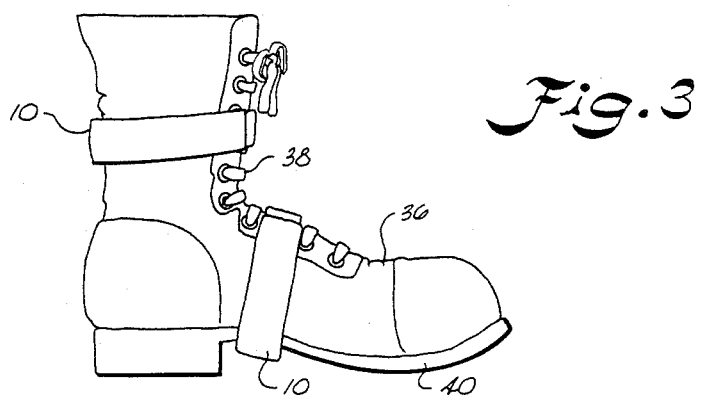
FIG. 3 is a side elevational view of a preferred form of scented hunting device attached to a hunter's boot.

FIG. 3 illustrates two scented hunting devices 10 attached to a boot 36. One scented hunting device 10 is attached around the top of a boot and can be provided with Velcro co-operating fasteners 22, 24 or string co-operating fasteners 22, 24 which alternately could be tied to the laces 38 of boot 36. Another scented hunting device 10 is attahced to boot 36 so that absorbent material member 14 projects away from sole 40 of boot 36, dispensing the scented substance as the hunter walks, thereby allowing the odors of the hunter's trail to masked. The scented hunting device 10 which attaches to sole 40 of boot 36 can be attached to boot 36 with Velcro co-operating fasteners 22, 24, or co-operating fasteners 22, 24 constructed of string which would tie into laces 38 of boot 36, or with any other suitable fastening member attachable to ends 18, 20 of flexible strap 12.

Figure 4:
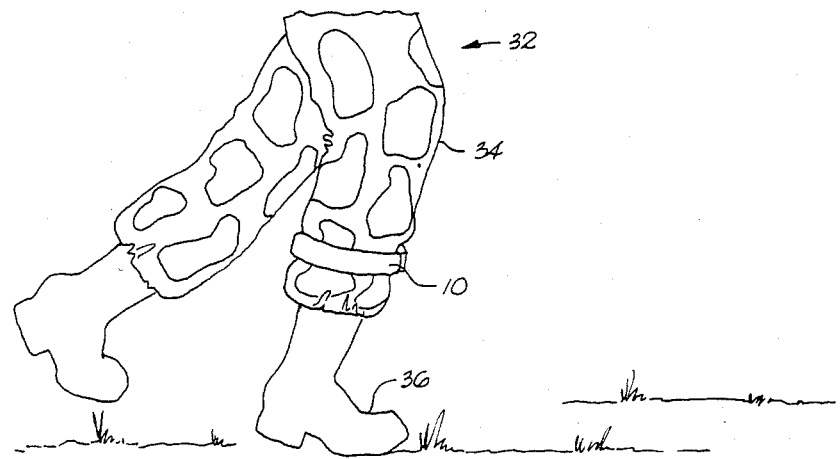
FIG. 4 is a side elevational view of a preferred form of a scented hunting device attached to the leg of a hunter.

FIG. 4 illustrates scented hunting device 10 attached to a leg 34 of hunter 32. Scented hunting device 10 could be attached to any portion of a leg 34 of hunter 32 and to either leg or both legs of hunter 32.

Figure 5:
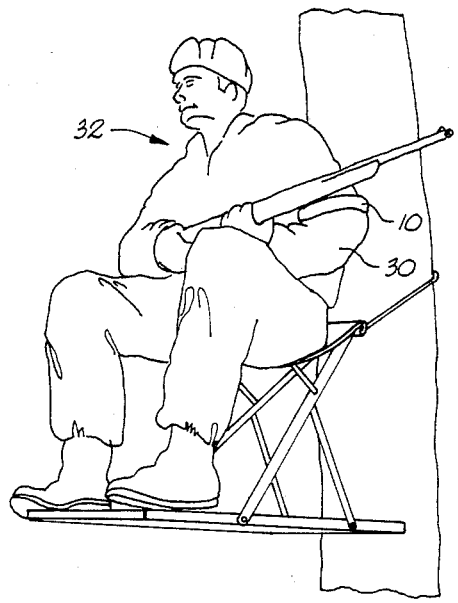
FIG. 5 is a side elevational view of a preferred form of a scented hunting device attached to the arm of a hunter.

FIG. 5 illustrates the scented hunting device 10 attached to the arm 30 of a hunter 32. Scented hunting device 10 can be attached anywhere on the arm and could be attached to either arm or both arms of hunter 32.

Figure 6:
FIG. 6 is a perspective view of an alternate embodiment of a scented hunting device constructed in accordance with the present invention and attached to a hunter's boot.

FIG. 6 illustrates an alternate embodiment scented hunting device 110 constructed in accordance with the present invention. Scented hunting device 110 includes an upper flexible strap 12 located adjacent top of boot 36 and a lower flexible strap 12 which is positioned at the sole 40 of boot 36. Connected between upper strap 12 and lower strap 12 is a interconnecting strap 142. Another interconnecting strap (not shown) is similarly provided on the other side of boot 36. Interconnecting strap 142 serves to maintain the relative positioning of upper strap 12 and lower strap 12 relative to one another during walking. It is to be understood that there are various means for maintaining the relative positioning of upper strap 12 and lower strap 12 relative to one another and that such means is not limited to the illustrated interconnecting strap 142 illustrated in FIG. 6.

Figure 7:
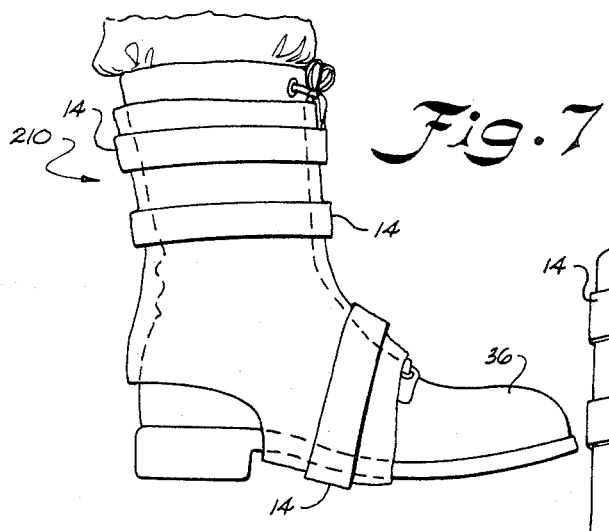
FIG. 7 is a side elevational view of an alternate embodiment scented hunting device constructed in accordance with the present invention.
Figure 8:
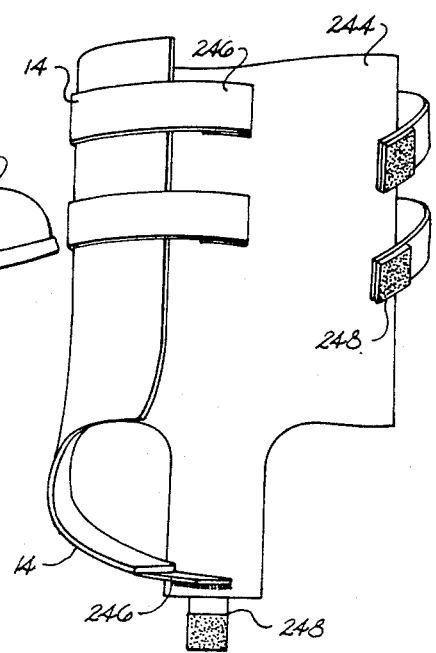
FIG. 8 is a perspective view of the alternate embodiment scented hunting device illustrated in FIG. 7.

FIGS. 7 and 8 illustrate an alternate embodiment scented hunting device 210 constructed in accordance with the present invention. Scented hunting device 210 includes a flexible sleeve or sheath 244 having absorbent material members 14 attached to the exterior surface of sheath 244. Sheath 244 of scented hunting device 210 is wrapped around boot 36 so that absorbent material members 14 are exposed at various positions about boot 36, including the sole thereof. Opposite edges 246, 248 of material members 14 are provided with co-operating fasteners such as those provided scented hunting device 10 and can be constructed with a zipper, Velcro strips, buttons, snaps, strings, etc. Preferably, the areas of sheath 244 to which absorbent material members 14 are attached are constructed of non-absorbent, non-porous material to prevent a scented substance absorbed in absorbent material members 14 from passing through sheath 244 onto boot 36.

In addition to being used by hunters for masking human odors, the scented hunting device of the present invention could be used by wildlife photographers, naturalists, etc. Because the scented hunting device masks human odors from animal detection, such persons could likely get a closer view of wildlife before being sensed by the animal.

While a preferred embodiment of the invention has been described using specific terms, such description is for illustrative purposes only, and it is to be understood that changes and variations may be made without departing from the spirit or scope of the following claims.

What is claimed is:

1. A scent dispenser for attachment to both an upper portion and a sole portion of an article of footwear, said scent dispenser dispensing a scented substance to mask human odors from detection by animals, said scent dispenser comprising:

a non-absorbent flexible body member having a first portion for encompassing the upper portion of the article of footwear and a second portion for crossing the sole portion of the article of footwear, said non-absorbent body member being impervious to penetration therethrough by the scented substance;

an absorbent material attached to both said first and second portions of said non-absorbent flexible body member;

said absorbent material being capable of allowing the scented substance, once absorbed by the absorbent material, to disperse freely therefrom upon exposure of said absorbent material to air; and co-operating fastening members attached to said scent dispenser for use in attaching said scent dispenser to the article of footwear, such that said non-absorbent flexible body member is between said absorbent material and the article of footwear, whereby the path and surrounding area taken by the wearer may be subjected to said scented substance dispersed from said absorbent material for masking human odors.

2. A scent dispenser as defined in claim 1, wherein said absorbent material is a fibrous material.

3. A scent dispenser as defined in claim 1, wherein said absorbent material is a felt material.

4. A scent dispenser as defined in claim 1, wherein said co-operating fastener members are constructed of mateable materials having a first member with hooks and a second member with engagement strands such that upon engagement of said first member and said second member, said hooks and said engagement strands intertangle and hold said first and second members together.

5. A scent dispenser for attachment to a person, said scent dispenser dispensing a scented oil to mask human odors from detection by animals, said scent dispenser comprising:

a non-absorbent flexible body member, said non-absorbent flexible body member being impervious to penetration therethrough by the scented oil;

an absorbent felt material attached to said non-absorbent flexible body member capable of having absorbed therein a scented oil for maskng human odors, said absorbent felt material including oleophyllic synthetic polymeric fibers for attracting said scent oil;

said absorbent material being capable of allowing the scented oil, once absorbed by the absorbent material, to disperse freely therefrom upon exposure of said absorbent material to air; and co-operating fastening members attached to said scent dispenser for use in attaching said scent dispenser to the person, such that said non-absorbent flexible body member is between said absorbent felt material and the person.

6. A scent dispenser as defined in claim 5, wherein said co-operating fastening members are constructed of mateable materials having a first member with hooks and a secnd member with engagement strands such that upon engagement of said first member and said second member, said hooks and said engagement strands intertangle and hold said first and second member together.

7. A scent dispenser as defined in claim 5, wherein said absorbent material has absorbed therein a scented oil for masking human odor from detection by animals.

* * * * *